(12) United States Patent
Choi et al.

(10) Patent No.: US 7,766,296 B2
(45) Date of Patent: Aug. 3, 2010

(54) WALL MOUNTING STRUCTURE FOR A FLAT PANEL DISPLAY

(75) Inventors: Chang Woo Choi, Daegu (KR); Jin Uk Baek, Gyeongsangbuk-do (KR)

(73) Assignee: LG Electronics Inc., Seoul (KR)

( * ) Notice: Subject to any disclaimer, the term of this patent is extended or adjusted under 35 U.S.C. 154(b) by 177 days.

(21) Appl. No.: 11/181,833

(22) Filed: Jul. 15, 2005

(65) Prior Publication Data

US 2006/0016941 A1    Jan. 26, 2006

(30) Foreign Application Priority Data

Jul. 21, 2004  (KR) ...................... 10-2004-0056831
Aug. 17, 2004  (KR) ...................... 10-2004-0064610

(51) Int. Cl.
*A47B 91/00*  (2006.01)
*A47G 29/00*  (2006.01)
*B65D 19/00*  (2006.01)

(52) U.S. Cl. ............... 248/346.01; 248/176.1; 248/288.11; 248/291.1; 248/917; 248/919; 248/920; 248/921; 248/922; 248/349.1; 248/221.11; 248/599; 248/600; 248/488; 248/447.1; 248/469; 248/495; 361/679.01; 361/679.21

(58) Field of Classification Search ............... 248/176.1, 248/288.11, 291.1, 917, 919, 920, 921, 922, 248/346.01, 349.1, 221.11, 599, 600, 488, 248/447.1, 469, 495, 229.12, 229.14, 229.22, 248/229.24, 228.5, 230.5, 231.61, 607; 361/681, 361/682, 683, 679.01, 679.21

See application file for complete search history.

(56) References Cited

U.S. PATENT DOCUMENTS 1,211,998 A * 1/1917 Anthony ..................... 248/113
1,512,335 A * 10/1924 Heavin ....................... 248/488
4,290,216 A    9/1981 Gale (Continued)

FOREIGN PATENT DOCUMENTS

EP    1 172 600 A1    1/2002

(Continued)

OTHER PUBLICATIONS

Print out of webpage from the site www.touchscreens.com May 18, 2005.

*Primary Examiner*—J. Allen Shriver, II
*Assistant Examiner*—Nkeisha J Smith
(74) *Attorney, Agent, or Firm*—Birch, Stewart, Kolasch & Birch, LLP

(57) ABSTRACT

A wall mounting structure includes a display screen, a stand, and a base. The stand has an upper end connected to a rear surface of the display screen via a first hinge so as to enable the display screen to be rotated forward and backward. The base is fixed to a lower end of the stand and includes at least two rotatable mounting members formed on a lower part of the base. The rotatable mounting members enable the base to be detachably mounted on mounting brackets of a wall. The wall mounting structure enables a user to not only use a flat panel display on a table, but also to hang the flat panel display on mounting brackets fixed to a wall in an easy and simple manner without disassembling the display screen and the stand assembly from each other.

18 Claims, 7 Drawing Sheets

U.S. PATENT DOCUMENTS

| | | | |
|---|---|---|---|
| 4,986,503 A | | 1/1991 | Kabat |
| 5,812,368 A | | 9/1998 | Chen et al. |
| 5,947,429 A | * | 9/1999 | Sweere et al. .......... 248/123.11 |
| 5,992,809 A | * | 11/1999 | Sweere et al. ............ 248/278.1 |
| 6,102,348 A | * | 8/2000 | O'Neill ................. 248/289.11 |
| 6,419,196 B1 | | 7/2002 | Sweere et al. |
| 6,484,994 B2 | * | 11/2002 | Hokugoh .................... 248/371 |
| 6,543,734 B2 | | 4/2003 | Yeh |
| 6,651,943 B2 | | 11/2003 | Cho et al. |
| 6,741,458 B2 | | 5/2004 | Wu |
| 7,175,152 B2 | * | 2/2007 | Dittmer ................. 248/221.11 |
| 7,233,487 B2 | * | 6/2007 | Stinson ...................... 361/681 |
| 2001/0048584 A1 | | 12/2001 | Rosen |
| 2003/0001053 A1 | | 1/2003 | Cho et al. |
| 2003/0201372 A1 | * | 10/2003 | Dozier .................... 248/286.1 |
| 2004/0211866 A1 | * | 10/2004 | Jung et al. .................. 248/133 |
| 2005/0205745 A1 | * | 9/2005 | Lee ............................ 248/371 |
| 2006/0038104 A1 | * | 2/2006 | Choi .......................... 248/370 |
| 2006/0291152 A1 | * | 12/2006 | Bremmon .................. 361/681 |

FOREIGN PATENT DOCUMENTS

| | | |
|---|---|---|
| JP | 10-333594 A | 12/1998 |
| JP | 2004-205859 A | 7/2004 |
| KR | 2000-0000827 A | 1/2000 |
| KR | 20-0341412 A | 2/2004 |
| KR | 10-2004-0028113 A | 4/2004 |

* cited by examiner

WALL MOUNTING STRUCTURE FOR A FLAT PANEL DISPLAY

This nonprovisional application claims priority under 35 U.S.C. §119(a) on Patent Application No. 10-2004-056831 filed in Korea on Jul. 21, 2004, and Patent Application No. 10-2004-064610 filed in Korea on Aug. 17, 2004, each of which are herein incorporated by reference.

BACKGROUND OF THE INVENTION

1. Field of the Invention

The present invention relates generally to a wall mounting structure for a flat panel display, such as an LCD monitor or LCD television. More particularly, the present invention relates to a wall mounting structure for a flat panel display by which a user can mount the flat panel display on a mounting bracket on a wall by means of at least two rotatable mounting members arranged at a lower surface of a base of a stand assembly of the flat panel display in an easy and convenient manner without separating the stand assembly from a display screen of the flat panel display.

2. Description of the Related Art

As shown in FIG. 1, a typical flat panel display includes: a display screen 1; a pivot member 2 connected to a rear surface of the display screen 1, so as to enable the display screen 1 to be rotated forward and backward, and clockwise and counterclockwise; a stand 3 connected to the pivot member 2 so as to support the display screen 1 so that the height of the display screen 1 can be adjusted; and a base 4 connected to a lower end of the stand 3 so as to support the stand 3.

Here, at least one coupling hole 1a is formed at an upper portion of the rear surface of the display screen 1, and a lock release part (not shown) having a hook for locking or releasing a portion of a corresponding object is formed at a lower portion of the rear surface of the display screen 1. Further, protuberances 2a each corresponding to the coupling hole 1a of the display screen 1 and the hook of the lock release part are formed at upper and lower portions of the pivot member 2 of the stand 3.

The coupling hole 1a is formed at an upper edge of a fixing plate 6 arranged between a main frame (not shown) and a back cover 5 of the display screen 1, and the upper edge of the fixing plate 6 is bent outward at a predetermined angle with respect to a plane of the main frame. The coupling hole 1a formed at the upper edge is exposed to the outside through the back cover 5, and each protuberance 2a of the pivot member 2 is bent to be parallel to the main plane of the pivot member 2.

Screw holes 6a are formed around four corner portions of the fixing plate 6 that enable the display screen 1 of the flat panel display to be mounted on a mounting bracket (not shown) of an indoor wall. Each of the screw holes 6a is formed through the back cover 5 of the display screen 1 to the exterior.

When the display screen 1 of the flat panel display is mounted on a mounting bracket (not shown) of an indoor wall, the display screen 1 is first separated from a stand assembly 7 including the pivot member 2, the stand 3, and the base 4. Thereafter, the screw holes 6a of the fixing plate 6 of the display screen 1 are aligned with coupling holes formed through the mounting bracket of the indoor wall. Then, the display screen 1 can be fixed to the mounting bracket by means of screws 8.

However, in order to hang the flat panel display on a wall, a user must first separate the display screen 1 from the stand assembly 7 of the flat panel display. Then, the user must align the display screen 1 with the mounting bracket fixed to the wall and then mount the display screen 1 on the mounting bracket by means of plural screws.

A central portion of the base of the stand assembly has an opening formed therein. If the opening is larger than a corresponding VESA (Video Electronics Standard Association) standard for wall mounting, it is nearly impossible to hang the stand assembly on the mounting bracket due to the opening.

SUMMARY OF THE INVENTION

The present invention has been made to solve the above-mentioned problems occurring in the related art.

It is an object of the present invention to provide a wall mounting structure for a flat panel display, by which a user can mount the flat panel display on a mounting bracket on a wall in an easy and convenient manner without separating a stand assembly from a display screen of the flat panel display.

It is another object of the present invention to provide a wall mounting structure for a flat panel display, which satisfies a VESA (Video Electronics Standard Association) standard for the wall mounting.

In order to accomplish the above objects of the present invention, there is provided a wall mounting structure for a flat panel display, the wall mounting structure comprising: a display screen; a stand having an upper end connected to a rear surface of the display screen via a first hinge, so as to enable the display screen to be rotated forward and backward; and a base including at least two rotatable mounting members formed on a lower part of the base, the rotatable mounting members enabling the base to be detachably mounted on a mounting bracket of a wall, a lower end of the stand being fixed to the base.

The foregoing and other objects, features and advantages of the present invention will become more apparent from the following detailed description when taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Figure 1:
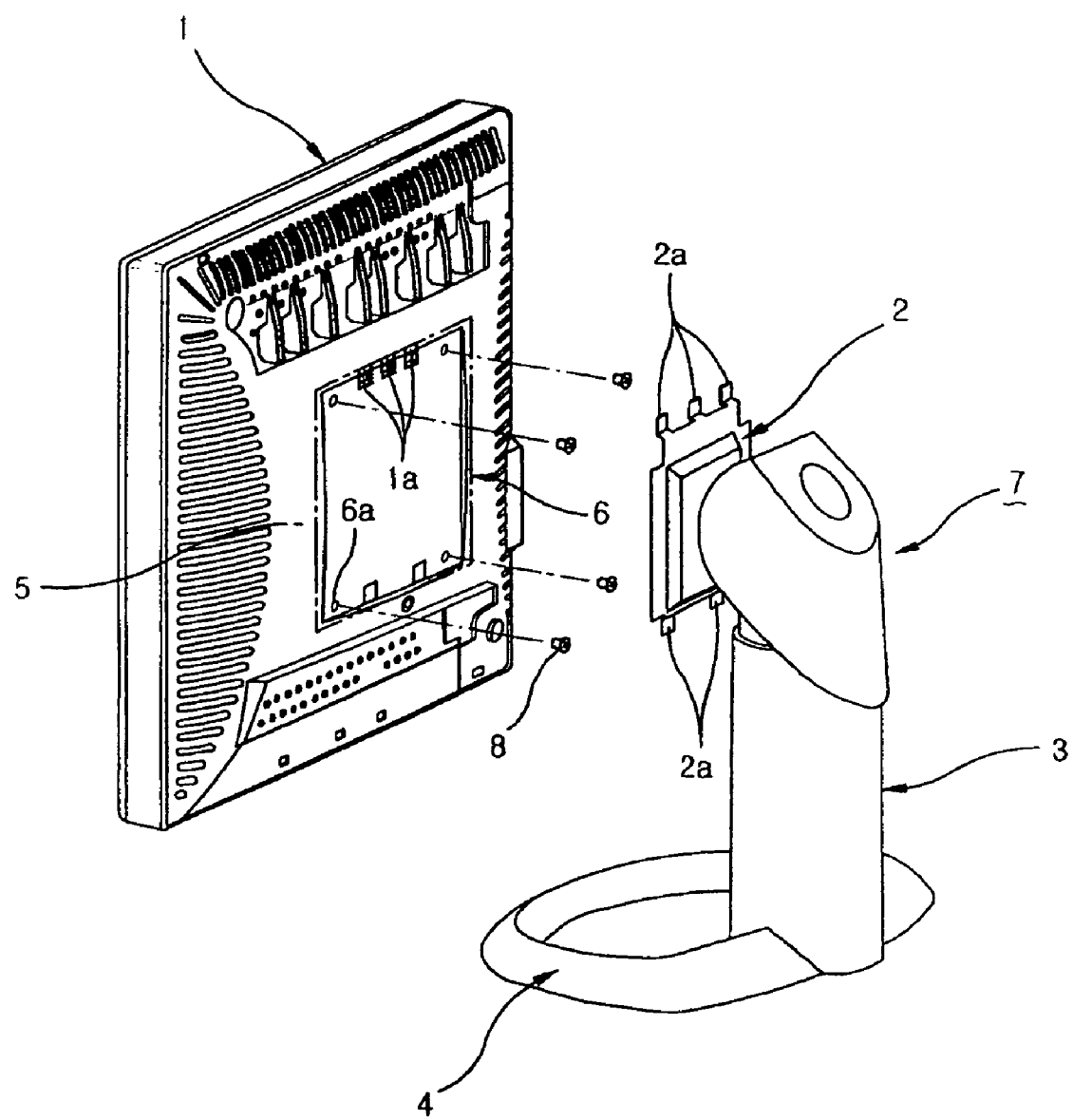
FIG. 1 is a schematic exploded perspective view of a typical flat panel display.
Figure 2:
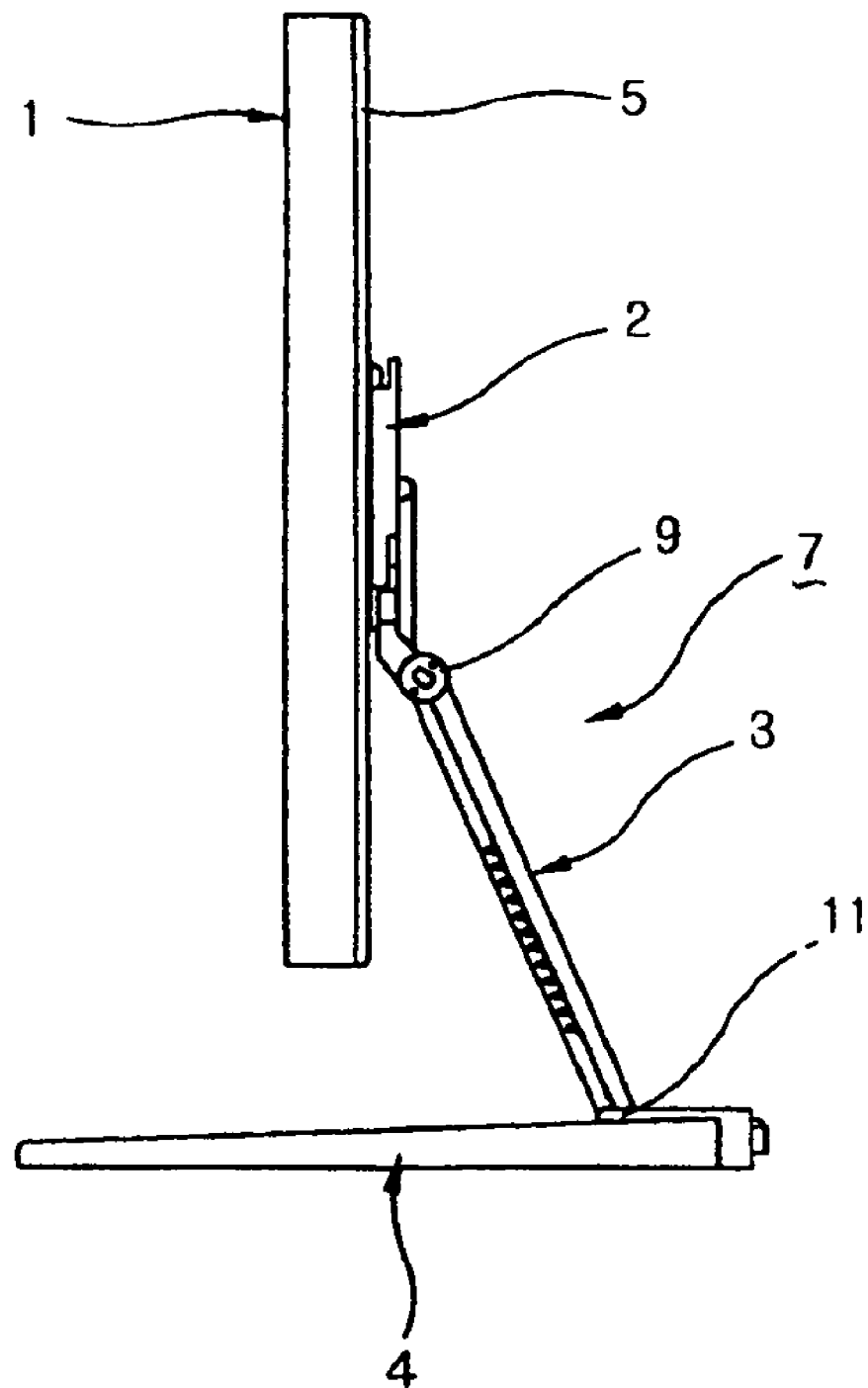
FIG. 2 is a schematic side view of an upright flat panel display having a wall mounting structure according to a first embodiment of the present invention.
Figure 3:
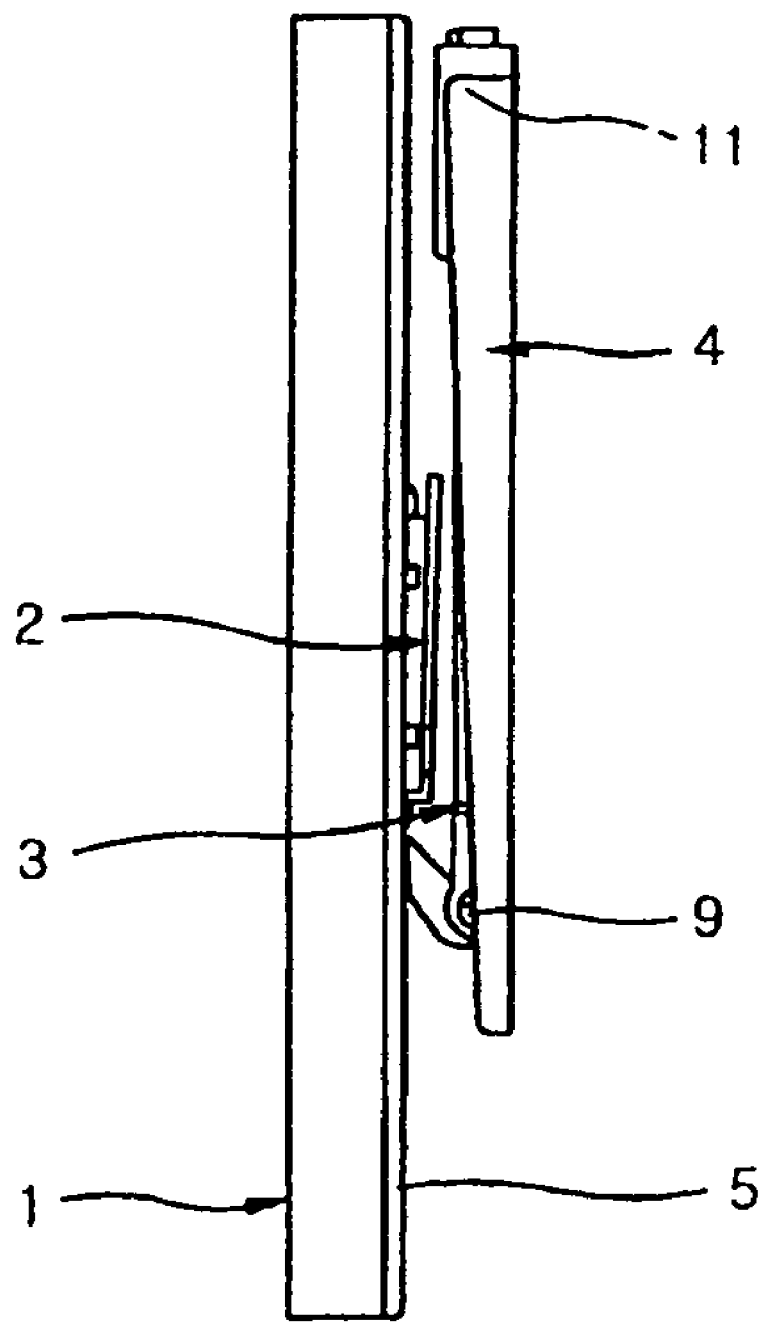
FIG. 3 is a schematic side view of a folded flat panel display having a wall mounting structure according to the first embodiment of the present invention.

Reference will now be made in detail to the preferred embodiment of the present invention, examples of which are illustrated in the accompanying drawings. Wherever possible, the same reference numbers will be used throughout the drawings to refer to the same or like parts. Hereinafter, embodiments of the present invention will be explained with reference to FIGS. 2 through 8.

A wall mounting structure of a flat panel display according to the present invention generally includes a display screen 1, a pivot member 2, a stand 3 and a base 4. The stand 3 has an upper end connected to a rear surface of the display screen 1 via a first hinge 9 that enables the display screen 1 to be rotated forward and backward. The base 4 is fixed to a lower end of the stand 3 and includes at least two rotatable mounting members 10 formed on a lower part of the base 4 that enable the base 4 to be detachably mounted on mounting brackets (not shown) of a wall.

The lower end of the stand 3 is preferably connected through a second hinge 11 to a corresponding portion of the base 4 so that the height of the display screen 1 can be adjusted (i.e., the display screen 1 can be adjusted upward or downward). Also, the base 4 preferably has an opening formed through a central portion of the base so that the stand assembly 7 can be folded in a state in which the base 4 and the display screen 1 overlap on each other (see FIGS. 4 and 5). The pivot member 2 may be interposed between the rear surface of the display screen 1 and the first hinge 9 assembled with the upper end of the stand 3, so as to enable the display screen 1 to be rotated 360° about a central axis passing perpendicularly through the screen.

The rotatable mounting member 10 includes a rotatable holding arm 12, a pivot post 13 and a seating part 14. The rotatable holding arm 12 has a front end detachably mounted on a mounting bracket (not shown) fixed to a wall. The pivot post 13 is coupled with a rear end portion of the rotatable holding arm 12 so as to rotatably support the rotatable holding arm 12. The seating part 14 includes an arm-seating recess 14a and a post-seating hole 14b. The arm-seating recess 14a is formed on a bottom of the base 4 with a predetermined depth so as to seat the rotatable holding arm 12 in the arm-seating recess 14a. The post-seating hole 14b is formed within the arm-seating recess 14a and is screw-assembled with a lower portion of the pivot post 13 (see FIGS. 4 and 5).

Each rotatable holding arm 12 may be either fittingly inserted in the mounting bracket fixed to the wall without any fastener, or fixed to the mounting bracket by means of a fastener 15 such as a screw, or a bolt and nut. In the latter case of employing a fastener, an assembling portion 12a (for example, a through hole) is preferably formed at the free end of each rotatable holding arm 12, so that the fastener 15 can be assembled with the assembling portion 12a.

The base 4 may have either two, three or four of the rotatable mounting members 10 arranged at the lower part of the base 4, depending on the assembling conditions of the mounting brackets fixed to the wall. Also, each of the rotatable mounting members 10 may have either a long or a short rotatable holding arm 12 depending on the assembling conditions or positions of the mounting brackets fixed to the wall.

Figure 6:
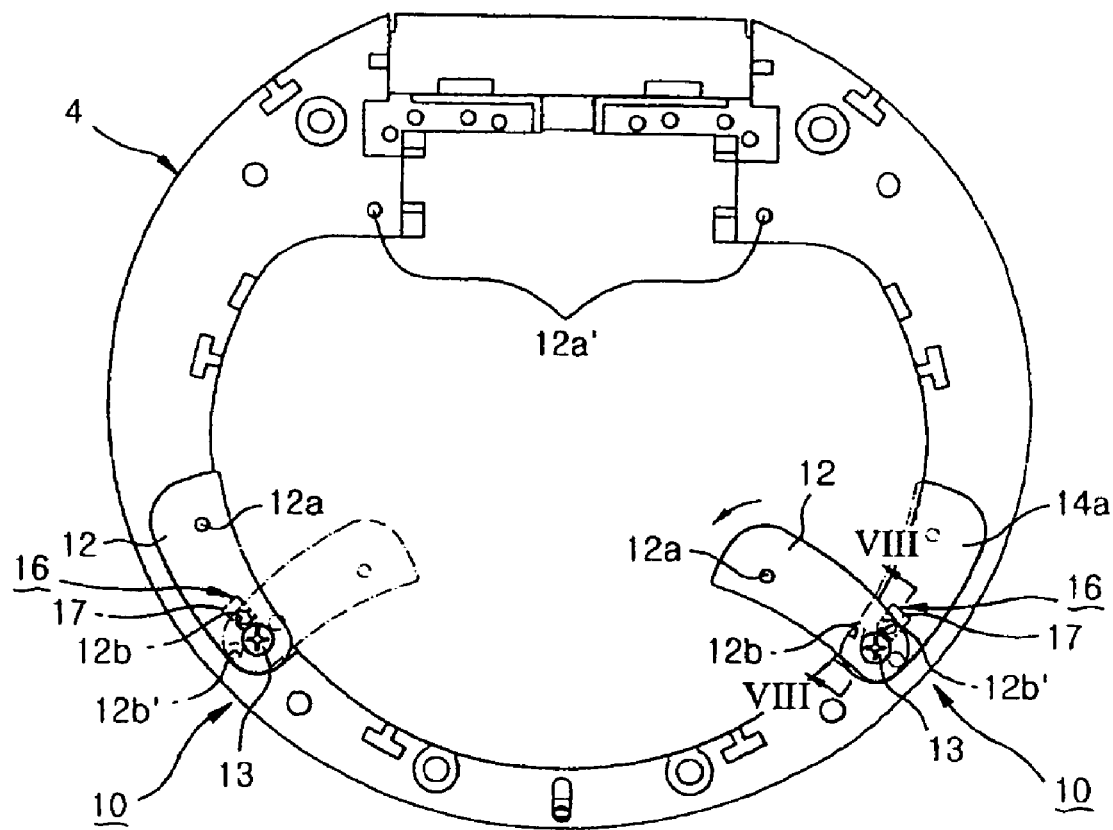
FIG. 6 is a schematic rear view of a wall mounting structure of a flat panel display according to a second embodiment of the present invention.
Figure 7:
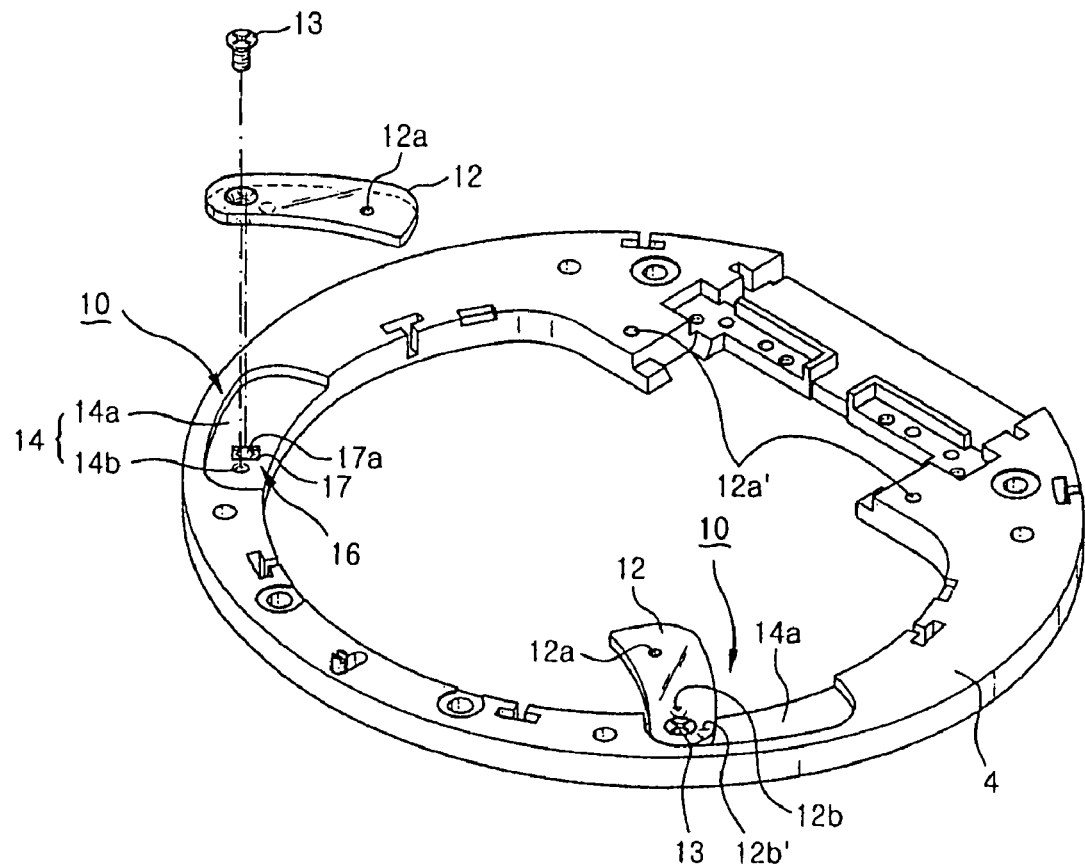
FIG. 7 is a schematic exploded perspective view of a wall mounting structure of a flat panel display according to the second embodiment of the present invention.
Figure 8:
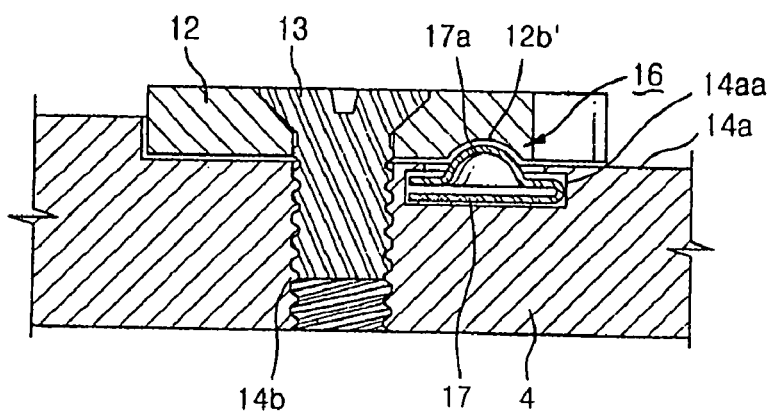
FIG. 8 is a sectional view taken along line VIII-VIII in FIG. 6.

In a second embodiment of the present invention, the rotatable holding arm 12 may further include an arm-holding means 16 for retaining the rotatable holding arm 12 at a particular position, for example a seated position or a rotated position, within a range in which the rotatable holding arm 12 rotates in a lower part of the base 4 (see FIGS. 6 through 8).

The arm-holding means 16 includes an elastic member space 14aa, an elastic member 17, and at least one holding groove 12b or 12b'. The elastic member space 14aa is formed within the arm-seating recess 14a of the base 4. The elastic member 17 is releasably seated in the elastic member space 14aa and has at least one holding protuberance 17a formed at one side of the elastic member 17. The at least one holding groove 12b or 12b' is formed at a portion of the rotatable holding arm 12 corresponding to the holding protuberance 17a of the elastic member 17 (see FIG. 8).

One of the holding grooves 12b and 12b' is formed at a portion of the rotatable holding arm 12 which corresponds to the holding protuberance 17a of the elastic member 17 when the rotatable holding arm 12 is located completely within the arm-seating recess 14a of the base 4. The other of the holding grooves 12b and 12b' is formed at another portion of the rotatable holding arm 12 which corresponds to the holding protuberance 17a of the elastic member 17 when the rotatable holding arm 12 has been rotated toward a central portion of the base 4.

The elastic member 17 is preferably made of a leaf spring, and the holding protuberance 17a is preferably formed integrally with the leaf spring. The assembling portion 12a is formed at a distal end of each rotatable holding arm 12 so that the rotatable holding arm 12 can be fixed to the mounting bracket (not shown) of the wall by means of the fastener 15.

When the base 4 has only two rotatable holding arms 12 formed at portions of a lower part of the base 4, the base 4 preferably has two corresponding assembling portions 12a' formed at other portions of the lower part, as shown in FIG. 6. The assembling portion 12a of each rotatable holding arm 12 or each corresponding assembling portion 12a' of the base 4 is preferably a through hole, and the fastener 15 is preferably a screw. The interval between the assembling portions 12a of the rotatable holding arm 12 opposed to each other and the interval between corresponding assembling portions 12a' of the base 4 preferably satisfy the VESA standard, regardless of the number (two or four) of the assembling portions 12a formed at the lower part of the base 4.

A process and an operation for assembling a flat panel display employing the wall mounting structure according to the first embodiment of the present invention will now be described with reference to FIGS. 2 through 5. In order to fold a flat panel display standing upright on a table and then hang the monitor on a wall, a user first pushes the display screen 1 around the first hinge 9 toward the stand 3 to fold the display screen 1 and the stand 3 together. Then, the user pushes the display screen 1 and the stand 3 toward the base 4 around the second hinge 11 (see FIGS. 2 and 3).

Then, the user picks up the flat panel display and aligns the monitor with mounting brackets (not shown) fixed to a wall. In this state, the user rotates the rotatable holding arms 12 of the rotatable mounting members 10 provided at the lower part of the base 4 of the flat panel display outward from the arm-seating recesses 14a and then fittingly inserts the front end of the rotatable holding arms 12 into corresponding portions of the mounting brackets (see FIG. 3).

Figure 4:
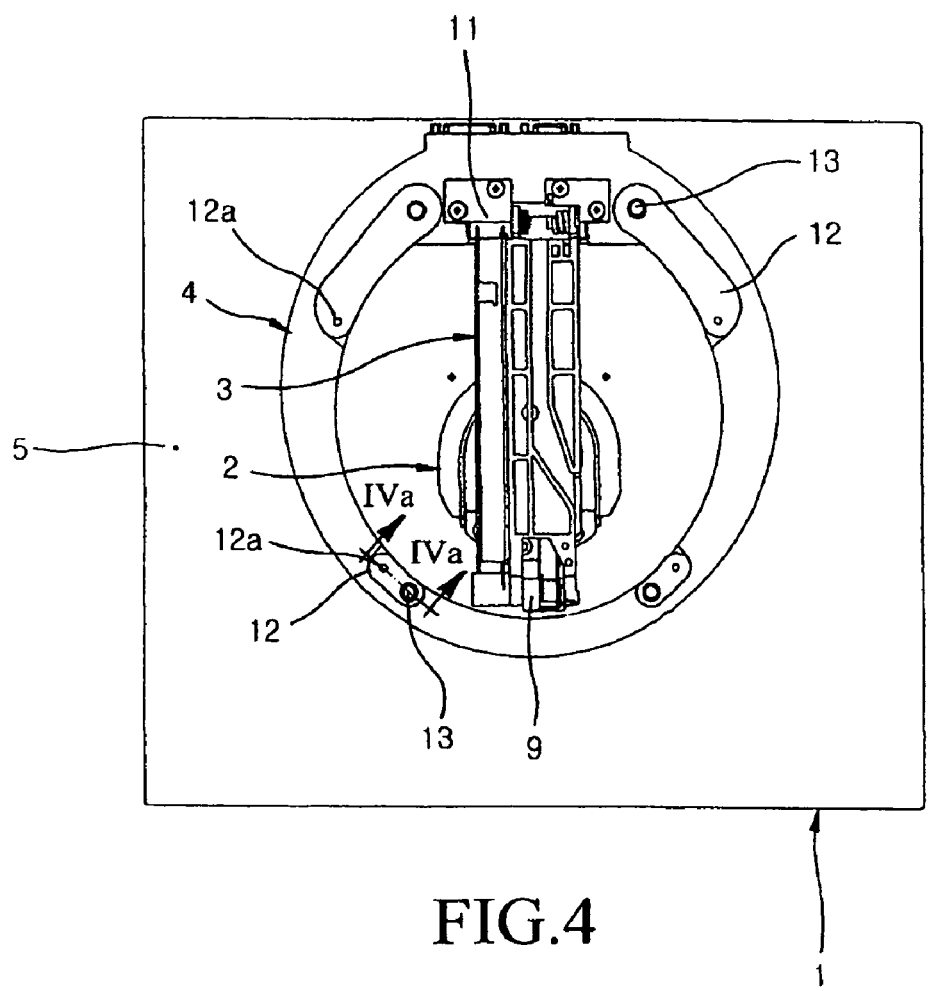
FIG. 4 is a schematic rear view of a wall mounting structure of a flat panel display according to the first embodiment of the present invention.
Figure 4A:
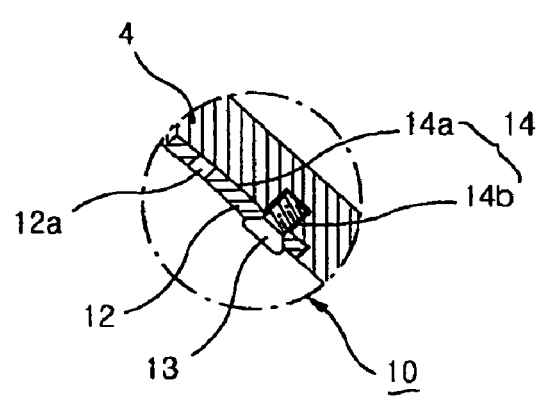
FIG. 4a is an enlarged sectional view taken along line IVa-IVa in FIG. 4.
Figure 5:
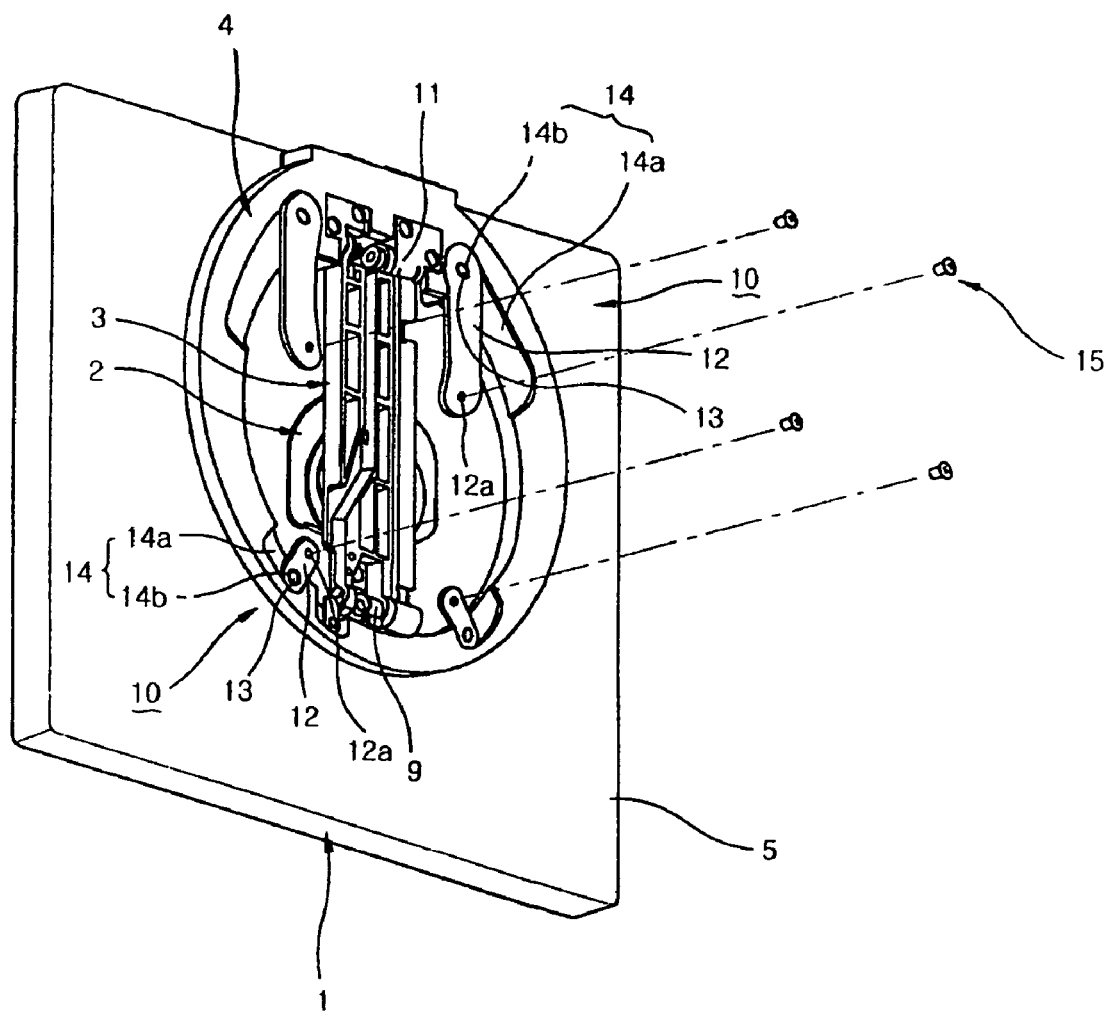
FIG. 5 is a schematic rear perspective view of a wall mounting structure of a flat panel display according to the first embodiment of the present invention.

Not only can each rotatable holding arm 12 be fittingly inserted into the corresponding portions of the mounting brackets, but also each rotatable holding arm 12 can be fixed to the mounting brackets by means of the fastener 15 (see FIGS. 4 and 5). Also, the flat panel display can be hung on the wall not only in a state where the display screen 1, the stand 3, and the base 4 are completely folded on each other by means of the first hinge 9 and the second hinge 11, but also in a state where the stand 3 makes a predetermined angle with respect to the base 4 without the second hinge 11.

Each rotatable mounting member 10 of the base 4 may be mounted on any side of the mounting bracket. When the display screen 1 is erroneously located, the display screen 1 can be rotated around the pivot member 2 so that the location of the display screen 1 can be adjusted to be capable of correctly displaying an image.

A process and an operation for assembling a flat panel display employing the wall mounting structure according to the second embodiment of the present invention will now be described with reference to FIGS. 6 through 8. In order to fold a flat panel display standing upright on a table and then hang the monitor on a wall, a user first pushes the display screen 1 around the first hinge 9 toward the stand 3 to fold the display screen 1 and the stand 3 together. Then, the user pushes the display screen 1 and the stand 3 toward the base 4 around the second hinge 11 (see FIGS. 2 and 3).

Then, the user picks up the flat panel display and aligns the monitor with mounting brackets (not shown) fixed to a wall. In this state, the user pulls the rotatable holding arms 12 of the rotatable mounting members 10 provided at the lower part of the base 4 of the flat panel display toward the central portion of the base 4 (see FIG. 6). The holding protuberance 17a of each elastic member 17 seated in the elastic member space 14aa of the base 4 thereby escapes from the first holding groove 12b of the rotatable holding arm 12, so that the rotatable holding arm 12 rotates about the pivot post 13 toward the central portion of the base 4 (see FIGS. 7 and 8).

When the rotatable holding arm 12 has been completely rotated in the direction toward the central portion of the base 4, the holding protuberance 17a of the elastic member 17 becomes elastically engaged with the second holding groove 12b' of the rotatable holding arm 12, so that the rotatable holding arm 12 can be maintained at that position.

The interval between the assembling portions 12a of the two rotatable holding arms 12 opposed to and spaced from each other and the interval between the corresponding assembling portions 12a' of the base 4 opposed to and spaced from each other satisfy the VESA standard for the wall mounting. Thereafter, the assembling portions 12a of the two rotatable holding arms 12 and the corresponding assembling portions 12a' of the base 4 are aligned and assembled with corresponding portions of the mounting brackets on the wall by means of screws.

In order to use the flat panel display on a table instead of mounting the monitor on the mounting brackets on the wall, a user can release the screws from the mounting brackets and the base 4 and completely rotate the rotatable holding arms 12 toward the arm-seating recesses 14a of the base 4. The holding protuberance 17a of the elastic member 17 is thereby disengaged from the second holding groove 12b' of each rotatable holding arm 12 and becomes elastically engaged with the first holding groove 12b of the rotatable holding arm 12, so as to hold the rotatable holding arm 12 in that position.

Then, the user can rotate the display screen 1 in a desired direction around the first hinge 9 between the display screen 1 and the stand 3 and around the second hinge 11 between the stand 3 and the base 4, so as to properly adjust the screen or image of the display screen 1.

As noted from the above description, the present invention enables a user to not only use a flat panel display on a table but also to hang the flat panel display on mounting brackets fixed to a wall in an easy and simple manner without disassembling the display screen and the stand assembly of the flat panel display from each other. Further, according to the present invention, employment of only the rotatable holding arm in the base without any change in the basic design of the base partially constituting the stand assembly easily meets the VESA standard for wall mounting.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A wall mounting structure for a flat panel display, comprising:
    a stand having an upper end connectable to a rear surface of a display screen; and
    a base attached to a lower end of the stand, the base including at least two rotatable mounting members formed on a lower part of the base,
    wherein the rotatable mounting members rotate toward a central portion of the base to enable the base to be detachably mounted to a mounting bracket of a wall,
    wherein each of the rotatable mounting members is rotatable at one end to be selectively seated in an arm-seating recess formed in an underside surface of the base, the arm-seating recess having a predetermined depth for seating the rotatable mounting member, the underside surface of the base facing away from the lower end of the stand, and
    wherein the rotatable mounting members include:
        a rotatable holding arm having a front end detachably mountable to a mounting bracket fixed to a wall;
        a pivot post coupled with a rear end portion of the rotatable holding aim, to rotatably support the rotatable holding arm, wherein said rotatable holding arm is selectively seated in the arm-seating recess; and
        a seating part including a post-seating hole formed within the arm-seating recess and assembled with a lower portion of the pivot post.

2. The wall mounting structure as claimed in claim 1, wherein the rotatable holding arm of the rotatable mounting member further includes arm-holding means for retaining the rotatable holding arm at a particular position within a range in which the rotatable holding arm rotates in a lower part of the base.

3. The wall mounting structure as claimed in claim 2, wherein the arm-holding means includes:
    an elastic member space formed within the arm-seating recess of the base;
    an elastic member releasably seated in the elastic member space and having at least one holding protuberance formed at one side of the elastic member; and
    at least one holding groove formed at a portion of the rotatable holding arm corresponding to the holding protuberance of the elastic member.

4. The wall mounting structure as claimed in claim 3, wherein the elastic member comprises a leaf spring, and the holding protuberance is formed integrally with the leaf spring.

5. The wall mounting structure as claimed in claim 1, wherein an assembling portion is formed at a distal end of each rotatable holding arm, so that the rotatable holding arms are fixable to the mounting bracket of the wall by a fastener.

6. The wall mounting structure as claimed in claim 5, wherein the base includes only two rotatable holding arms formed at portions of a lower part of the base, together with two corresponding assembling portions formed at other portions of the lower part of the base.

7. The wall mounting structure as claimed in claim 6, wherein the assembling portion of each rotatable holding arm is a through hole, and each of the corresponding assembling portions of the base is a through hole.

8. The wall mounting structure as claimed in claim 6, wherein each of the interval between the assembling portions of the rotatable holding arm opposed to each other and the corresponding assembling portions of the base satisfies the VESA standard.

9. The wall mounting structure as claimed in claim 1, wherein the predetermined depth of the arm-seating recess enables the rotatable mounting member, when seated, to be flush with the underside surface of the base.

10. The wall mounting structure as claimed in claim 1, wherein the rotatable mounting members are selectively retained at one of a first extended position and a second retracted position by arm holding means provided for each of the rotatable mounting members at points determining the first extended position and the second retracted position, respectively.

11. A support structure for a flat panel display, comprising:
a stand having an upper end connectable to a rear surface of a display screen;
a base connected to a lower end of the stand; and
first and second mounting arms pivotally attached to a first underside surface of the base, the first underside surface of the base facing away from the lower end of the stand,
wherein the first and second mounting arms are selectively retained at one of a first extended position and a second retracted position by arm holding means provided for each of said first and second mounting arms at points determining the first extended position and the second retracted position, respectively,
wherein the mounting arms enable the base to be detachably mounted to a mounting bracket of a wall when retained in the first extended position, and
wherein the arm holding means comprises first and second holding detents formed at portions of the mounting aims corresponding to the first extended position and the second retracted position.

12. The support structure as claimed in claim 11, wherein the arm holding means for each mounting arm further comprises:
an elastic member having a holding protuberance for selectively engaging with each of the first and second holding detents.

13. The support structure as claimed in claim 11, further comprising third and fourth mounting arms pivotally attached to a second underside surface of the base, the second underside surface of the base facing away from the lower end of the stand, each of the first through fourth mounting arms being movable between the first extended position and the second retracted position, the second retracted position enabling the mounting arms to be seated in the base.

14. The support structure as claimed in claim 11, further comprising first and second assembling portions located on the base of said stand, each of the first and second assembling portions being non-movable and enabling the base to be detachably mounted to the mounting bracket of the wall, each of the first and second mounting arms being movable between the first extended position and the second retracted position, the second retracted position enabling the mounting arms to be seated in the base.

15. The support structure as claimed in claim 11, wherein each of the rotatable mounting arms is selectively seated in an arm-seating recess formed in an underside surface of the base, the arm-seating recess having a predetermined depth for seating the rotatable mounting arm flush with the underside surface of the base.

16. The support structure as claimed in claim 13, wherein each of the first and second mounting arms have a first length and each of the third and fourth mounting arms have a second length and wherein the longer mounting arms are coupled to said base to be disposed adjacent the lower end of said stand and the shorter mounting arms are coupled to said base to be disposed opposite the longer mounting arms.

17. The support structure as claimed in claim 14, wherein said first and second assembling portions are located on the base adjacent the lower end of said stand and wherein the first and second mounting arms are coupled to said base to be disposed opposite said first and second assembling portions.

18. A flat panel display, comprising:
a display screen;
a stand having an upper end connected to a rear surface of a display screen via a first hinge; and
a base connected to a lower end of the stand via a second hinge; and
first and second mounting arms pivotally attached to an underside surface of the base, the underside surface of the base facing away from the lower end of the stand, the first and second mounting arms being movable between a first extended position enabling the base to be detachably mounted to a mounting bracket of a wall, and a second retracted position,
wherein the first and second mounting arms are selectively retained at one of a first extended position and a second retracted position according to first and second detents formed in each of the first and second mounting arms at points determining the first extended position and the second retracted position, respectively.

* * * * *